(12) United States Patent
Feldmann et al.

(10) Patent No.: US 10,875,094 B2
(45) Date of Patent: Dec. 29, 2020

(54) ADDITIVE MANUFACTURING SYSTEMS AND METHODS

(71) Applicant: VulcanForms Inc., Burlington, MA (US)

(72) Inventors: Martin C. Feldmann, Somerville, MA (US); Jan Pawel Komsta, Northborough, MA (US); Matthew Sweetland, Burlington, MA (US)

(73) Assignee: VulcanForms Inc., Burlington, MA (US)

( * ) Notice: Subject to any disclaimer, the term of this patent is extended or adjusted under 35 U.S.C. 154(b) by 183 days.

(21) Appl. No.: 15/940,315

(22) Filed: Mar. 29, 2018

(65) Prior Publication Data
US 2019/0299286 A1 Oct. 3, 2019

(51) Int. Cl.
| | |
|---|---|
| B22F 3/105 | (2006.01) |
| B23K 26/073 | (2006.01) |
| B23K 26/06 | (2014.01) |
| B33Y 30/00 | (2015.01) |
| B33Y 10/00 | (2015.01) |

(52) U.S. Cl.
CPC ........ *B22F 3/1055* (2013.01); *B23K 26/0626* (2013.01); *B23K 26/0648* (2013.01); *B23K 26/0732* (2013.01); *B22F 2003/1057* (2013.01); *B33Y 10/00* (2014.12); *B33Y 30/00* (2014.12)

(58) Field of Classification Search
CPC .............. B23K 26/064; B23K 26/0643; B23K 26/0648; B23K 26/0652; B23K 26/066; B23K 26/0661; B33Y 30/00; B22F 3/1055
See application file for complete search history.

(56) References Cited

U.S. PATENT DOCUMENTS

| | | |
|---|---|---|
| 7,128,866 B1 | 10/2006 | Henningsen |
| 9,731,450 B2 | 8/2017 | Echigo et al. |
| 9,827,632 B2 | 11/2017 | Eibl et al. |

(Continued)

FOREIGN PATENT DOCUMENTS

| | | |
|---|---|---|
| DE | 10 2013 011676 A1 | 1/2015 |
| EP | 1 648 686 A1 | 4/2006 |

(Continued)

OTHER PUBLICATIONS

International Search Report and Written Opinion for International Application No. PCT/US2019/024832, dated Jun. 11, 2019.

(Continued)

*Primary Examiner* — Tu B Hoang
(74) *Attorney, Agent, or Firm* — Wolf, Greenfield & Sacks, P.C.

(57) ABSTRACT

Aspects described herein relate to additive manufacturing systems and related methods. An additive manufacturing system may include two or more laser energy sources and associated optical fibers. An optics assembly may be constructed and arranged to form a rectangular laser energy pixel associated with each laser energy source. Each pixel may have a substantially uniform power density, and the pixels may be arranged to form a linear array of laser energy pixels on a build surface with no spacing between the pixels. Exposure of a portion of a layer of material on the build surface to the linear array of laser energy pixels may melt the portion of the layer.

38 Claims, 18 Drawing Sheets

(56) References Cited

U.S. PATENT DOCUMENTS

| | | |
|---|---|---|
| 9,956,612 B1 | 5/2018 | Redding et al. |
| 2003/0075529 A1 | 4/2003 | Mazumder et al. |
| 2003/0214571 A1 | 11/2003 | Ishikawa et al. |
| 2008/0241392 A1 | 10/2008 | Dimter et al. |
| 2010/0060875 A1* | 3/2010 | Kwon .................... G03B 27/54 355/67 |
| 2012/0007288 A1 | 1/2012 | Wang et al. |
| 2012/0111146 A1 | 5/2012 | Kawano et al. |
| 2013/0056910 A1* | 3/2013 | Houbertz-Krauss .................. B29C 64/386 264/401 |
| 2013/0105447 A1 | 5/2013 | Haake |
| 2013/0337191 A1 | 12/2013 | Ramanujan et al. |
| 2014/0263209 A1 | 9/2014 | Burris et al. |
| 2014/0265049 A1 | 9/2014 | Burris et al. |
| 2016/0158889 A1 | 6/2016 | Carter et al. |
| 2017/0021455 A1 | 1/2017 | Dallarosa et al. |
| 2017/0304894 A1 | 10/2017 | Buller |
| 2018/0207722 A1 | 7/2018 | Feldmann et al. |

FOREIGN PATENT DOCUMENTS

| | | |
|---|---|---|
| JP | H08-057967 A | 3/1996 |
| WO | WO 2005/011959 A1 | 2/2005 |
| WO | WO 2013/136096 A1 | 9/2013 |
| WO | WO 2017/015241 A1 | 1/2017 |
| WO | WO 2017/085470 A1 | 5/2017 |

OTHER PUBLICATIONS

Invitation to Pay Additional Fees for International Application No. PCT/US2016/042860, dated Sep. 20, 2016.

International Search Report and Written Opinion for International Application No. PCT/US2016/042860, dated Dec. 8, 2016.

International Preliminary Report on Patentability for International Application No. PCT/US2016/042860, dated Feb. 1, 2018.

Extended European Search Report for European Application No. 16828388.5, dated Apr. 4, 2019.

* cited by examiner

ADDITIVE MANUFACTURING SYSTEMS AND METHODS

FIELD

Disclosed embodiments are related to systems and methods for additive manufacturing.

BACKGROUND

Many methods of metal additive manufacturing are currently available in the market. The methods can be separated by source of material (powder, wire, film etc.) and form of energy addition to obtain melting/bonding (laser melting, e-beam melting, welding arc, sintering etc.). The resolution, accuracy and obtainable feature size of the end part for a given process is based on the initial material form and the ability to control the energy placement for metal fusion. The effective rate of a given process is typically limited by the ability to delivery energy into the build surface in a controlled manner.

In a selective laser melting process for metal additive manufacturing, a laser spot is typically scanned over a thin layer of metal powder. The metal powder that is scanned with the laser spot is melted and fused into a solid metal structure. Once a layer is completed, the structure is indexed, a new layer of metal powder is laid down and the process is repeated. If an area is scanned with the laser spot on the new layer that is above a previous scanned area on the prior layer, the powder is melted and fused onto the solid material from the prior layer. This process can be repeated many times in order to build up a 3-dimensional shape of almost any form.

SUMMARY

In one embodiment, an additive manufacturing system comprises a build surface, two or more laser energy sources, and two or more optical fibers. Each optical fiber is configured to transmit laser energy from a first end coupled to an associated laser energy source of the two or more laser energy sources and out of a second end, and the second ends of the two or more optical fibers are arranged along a line. The additive manufacturing system further comprises an optics assembly constructed and arranged to shape the laser energy output from each optical fiber to form a rectangular laser energy pixel associated with each laser energy source. Each rectangular laser energy pixel has a substantially uniform power density, the rectangular laser energy pixels are arranged to form a linear array of laser energy pixels on the build surface with no spacing between adjacent laser energy pixels, and exposure of a layer of material on the build surface to the linear array of laser energy pixels melts at least a portion of the layer of material.

In another embodiment, a method for additive manufacturing comprises exposing a layer of material on a build surface to a linear array of laser energy pixels. Each laser energy pixel has a rectangular shape and a substantially uniform power density, and wherein there is no spacing between adjacent laser energy pixels. The method further comprises melting a portion of the layer of material due to exposure of the portion to the linear array of laser energy pixels.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
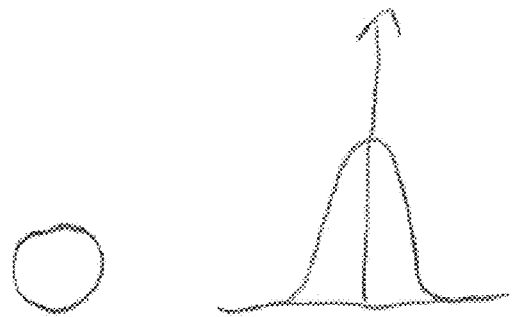
FIG. 1 is a schematic representation of a round beam with a Gaussian power density.

The inventors have recognized and appreciated that the thickness of a powder layer, the size of a laser spot, and the accuracy of laser spot motion may all combine to influence the dimensional precision and accuracy of the final part produced by a selective laser melting process. The size and power of the laser spot also may influence the rate limit of a given machine process. For example, for a given laser spot size, there is a minimum spot power to enable melting of the powder layer. Laser powers below this point cannot deliver sufficient energy to melt and fuse the powder under the laser spot, even if the laser spot is stationary on the powder surface. This minimum energy level is dependent on the material (e.g., the type of metal powder), the thermal characteristics of the powder bed, and the absorption characteristics of the powder surface with the given laser wavelength. If the laser spot is then scanned over the powder surface, this minimum laser power has to increase such that at the scanning velocity, the laser beam can still delivery sufficient energy to the powder to melt and fuse the powder during the time period while a given point is under the laser beam spot profile. The higher the scanning speed, the higher the minimum power required to maintain a continuous melt pool under the scanning spot.

Additionally, the inventors have appreciated that there is a limit to how much energy can be delivered under a given laser spot size. The incident laser energy is typically absorbed over a very narrow layer on the surface of the powder. This energy is converted to thermal energy in this thin layer and then conduction and convection allow this absorbed energy to diffuse further down into the powder layer. Conduction is limited by the fine contact points between the individual powder particles, and convection occurs through the gaps between the particles. If too much energy is incident on the layer surface, then the energy cannot diffuse into the full powder layer fast enough and the powder surface temperature will reach sufficiently high temperatures to vaporize parts of the metal powder surface. This rapid vaporization at the layer surface will cause powder particles to be ejected from the powder surface.

While the high incident energy can cause surface vaporization on the powder surface, it can also cause vaporization of the metal in a melt pool. The melt pool is the volume of molten metal produced by the laser heating of the metal powder while the laser spot is scanned over the powder surface. The melt pool may also be described as the volume of metal powder after it is melted and before the molten metal cools sufficiently to become a solid again. If some of the metal from the melt pool is vaporized due to excessive energy from the laser spot, the rapid expansion of the metal during the vaporization process can cause molten metal to be ejected from the melt pool. These ejected particles can deform the powder surface in areas yet to be scanned, thus causing further melt pool instabilities due to non-uniform surfaces.

Additionally, ejected particles of molten metal may be prone to forming oxides and/or other compounds due to their high surface area, elevated temperature, and exposure to surrounding gas during the ejection process. These particles may end up in an area that is scanned and melted during the continued scan process, and these particles can influence the microstructure and mechanical properties of the final part.

If the incident laser spot energy is too high and the scan speed is increased to compensate in order reduce the resulting metal vaporization issues noted above, the thermal energy may not be able to propagate sufficiently fast into the powder layer to fully melt and fuse all the metal powder. Accordingly, the final part will then contain voids of unmelted metal powder, which may compromise the properties of the final part.

In some instances, the above noted issues can be addressed by reducing the powder layer thickness to ensure full melting of all metal powder for a given laser spot energy and scan velocity. However, such an approach reduces the effective rate of the process as a larger number of thinner layers are required to build up a given part. Also, there is a limit to the layer thickness as the powder layer thickness cannot be less than the average powder particle size (typically in the 15-45 μm range).

Another issue arises as the laser spot power and velocities increase. If the incident power and scanning velocity are increased sufficiently while still being able to ensure full melting of all metal powder under the scan track, then the melt pool may still become unstable. Rather than producing a continuous melt pool that subsequently cools into a continuous solid metal track, the melt pool becomes unstable and starts to break into individual molten drops that then cool into disconnected balls on the surface of the processed area. This effect, sometimes referred to as "balling," is a mechanism of forming disconnected droplets due to the Rayleigh instability. This instability is observed once the length to width ratio of the melt pool reaches a certain critical value. High surface tension gradients can then lead to the formation of voids in the tail of the melt pool. The length to width ratio increases as the melt pool length grows far more rapidly with increased laser spot scanning speed than the width of the melt pool. Further factors that contribute to this melt pool instability effect are the specific local arrangement of powder particles, wetting, Marangoni flow and gravity.

In addition to the above, another possible method to increase the rate of a laser-based powder bed fusion/melting process is to increase the spot size. As the spot size increases, the average power density of the spot can remain constant while the total spot power increases, thereby increasing the effective machine rate. However, the inventors have recognized that this ability to increase the spot size is limited as at a certain size, the added power results in metal vaporization rather than an increased net effective powder processing rate. Also, as the spot size increases, the spatial resolution of the final finished part decreases. Once the feature size resolution decreases sufficiently, the benefits of the selective laser melting process disappear as the resulting part will require extensive post machining and processing to obtain a final desired and useful state.

In view of the foregoing, selective laser melting processes in current machines are bound by the physical limits of the process. Higher net processing rates are not possible while maintaining high quality process conditions. One approach to attempt to address these limits has been to add multiple laser beams to a single machine, with the beams scanned fully independently using rotating mirrors. For example, machines with two or even four beams are available with total powers in the 2-4 kW range. This approach can allow a higher effective machine rate by increasing the number of beam spots; however, each spot is still bound by the energy limits outlined above. Moreover, the positional accuracy between each spot location on the powder layer can make multi spot processing of a single point challenging without reducing part accuracy and resolution.

Multi-spot laser systems can have fully independent laser spot control which can be useful for producing multiple independent parts in a single powder bed, but the effective rate for each part/spot combination is still limited by the process power combinations. Using multiple independent spots on a single part is also possible, but then the location accuracy between the spots becomes very important and also very difficult to control. Part accuracy and resolution may be reduced and care must be taken to avoid interference between the beams and the beam positioning mechanics. As machine sizes increase to accommodate larger build volumes, maintaining positional accuracy between multiple independent spots becomes even more difficult.

Multi spot lasers systems can also be built with the final delivery optics fixed relative to each other. While this approach may aid in resolving the issue of positional accuracy between the spot locations, due to the size of the delivery optics, the layout of the spot location may not be optimal. For example, in order to keep the output spots located close together, the size of the delivery optics forces them to be placed significantly further apart than the spot size. In some instances, the beams can be brought together by placing the optics at angles to each other such that the beams converge either at the incident areas on the powder surface or at another point prior to a final reflecting mirror or galvo-scanner assembly. An issue with this approach, though, is that the angled incidence of the multiple spots causes different melt behavior under each laser spot. Different incident angles also limit how close each spot can be placed and maintained next to each adjacent spot. In order to get a uniform melt front from two adjacent round spots, the energy density within each spot has to be uniform, which can be very difficult to achieve with different incident angles and with separate delivery optics. For this reason, fixed relative position multi-spot laser systems are typically configured to operate with individual discrete spots that each generate separate melt pools. The scanning pattern is then designed to incrementally step over the gaps between the spots on successive scan passes. Moreover, the issue with placing multiple fixed optics heads next to each other puts practical limits on the number of laser units that can be employed at one time with this approach, and thus fixed independent laser optics head systems are typically limited to four to five individual laser spots.

Yet another approach used to try and address the above-noted power density limitations for single or multi-spot selective melting systems is to scan a spot very quickly back and forth along a linear path to generate a heated area that on average takes on the shape of a line. Even with very fast scan speeds, however, the resulting average line shape is still limited in power input by the thermal transfer characteristics of the powdered metal layer, as discussed above. For example, too much power still leads to metal vaporization and melt pool instability.

In view of the above, the inventors have recognized and appreciated numerous benefits associated with selective laser melting systems that utilize a line shaped incident energy source. For example, such systems may provide increased effective material processing rates compared to the above described approaches. In some embodiments, the instantaneous shape of the incident energy is a line with one dimension (e.g., a length of the line) greater than a second dimension (e.g., a width of the line). The power density profile across and along the line may be capable of being controlled to be substantially uniform and the line may be able to be scanned in at least two directions with the primary scanning direction perpendicular to the long dimension of the line. In some embodiments, the power density profile of the line can be modulated in time.

Embodiments described herein address many of the above-described issues with increasing the effective laser power delivery limits described while maintaining part resolution and accuracy even over larger build volumes in powder-bed metal additive manufacturing. The systems and methods described herein can deliver an arbitrarily large amount of laser power to the build surface in a controllable profile that can be scanned as a single entity. In some embodiments, the ideal shape of this incident laser power is a line with a long dimension and a short dimension where the primary scanning direction is perpendicular to the long direction of the line. The power density over the long direction of the line can be made substantially uniform.

According to some aspects, a line of incident laser energy consists of multiple individual laser energy pixels arranged adjacent to each other that can have their respective power levels individually controlled. Each laser energy pixel may be turned on or turned off independently and the power of each pixel can be independently controlled. The power density across any single pixel can be substantially uniform such that the pixel has a top hat energy profile when that pixel is turned on. In some embodiments, the power densities of two adjacent pixel may produce a uniform power density across the long length of the resulting line when both pixels are turned on and set to the same power densities.

Because the resulting pixel-based line is scanned primarily perpendicular to the long axis of the line, the forward velocities and pixel power densities are still bound by approximately the same power and velocity limits as traditional single spot laser selective melting processes. However, because there are multiple spots directly adjacent to each other, the effective process rate can be approximately N times the single pixel rate, where N is the number of available pixels. Also, because each pixel can be individually turned on or off, the effective part resolution and accuracy remains comparable to a single spot system. The system can be operated as a single spot system by only turning on a single pixel, but then the effective system rate will be substantially the same as a single spot system.

In some embodiments, an additive manufacturing system includes an optical path arranged within an optics assembly (e.g., an optics box) to generate the line comprising a set of lenses arranged in series. Alternatively or additionally, a mirror or multiple mirrors can be added to the beam path for beam turning or folding, and/or a galvo-scanner can be added to the beam path for one-axis powder bed scanning.

According to some aspects, laser energy for each laser energy pixel is generated by an independently controllable laser energy source and is delivered to the optics assembly through an individual optical fiber associated with each laser energy source. In some instances, each individual optical fiber may include fiber segments spliced together to form a single optical fiber. Alternatively or additionally, a single optical fiber path may be generated by using an optical connector to couple the ends of two fibers together. All of the optical fibers from the multiple (e.g., two or more) independent laser energy sources are routed to the optics assembly. Within the optics assembly, the ends of the optical fibers are received in a mounting fixture (e.g., a fiber holder) that ensures the ends of the optical fibers are parallel and aligned.

The ends of the multiple fiber optic cables may be cut and polished to ensure a clear and uniform optical path at the exit from each optical fiber. The ends of the multiple fiber optic cables may also be coated with an anti-reflected coating. From these fiber terminations, all the individual laser beams pass through a single set of optical lenses and mirrors within the optics assembly. This arrangement keeps the optical path of all laser energy sources identical and ensures the individual pixels from the individual laser energy sources to remain adjacent while keeping the size of the optical system to a minimum.

With all optics following the same optical path through the same lens arrays, the resulting laser energy line maintains its shape and may be reflected by single mirror assemblies and scanned using a single axis galvo-scanner mounted mirror. In this manner, an arbitrarily large number of laser systems can be combined into a pixel-based line to produce a high rate selective laser melting process.

As described in more detail below, in some embodiments, output from the optics assembly can be directed towards the powder layer using a galvo-scanner and then passed through a lens or lens assembly to minimize beam shape distortion for non-perpendicular incidence on the powder layer such as an f-theta or telecentric lens.

In some embodiments, output of the optics assembly may be scanned in a primary direction using a galvo-scanner while the entire optics assembly is scanned in a secondary direction perpendicular to the primary direction using a motorized stage actuator. Alternately the output of the optics assembly may be scanned in a fast motion using a galvo-scanner in a primary direction while the optics box is scanned in a slower motion in both the primary direction and a secondary direction perpendicular to the primary direction using orthogonally mounted motorized stages. In other embodiments, the output from the optic assembly may be scanned using only motorized stage movement without any galvo-scanner stage. In further embodiments, the optics assembly may be mounted such that the pixel array line output from the optics assembly is oriented at a fixed angle relative to the motion stages such that both stages must be actuated to move the line perpendicular to the long axis of the pixel line. Alternately this may be achieved with the output from the optics assembly being scanned using a galvo-scanner. In other embodiments, the output from the optics assembly may be dynamically rotated with respect to the motion stages during motion. Alternately the dynamic rotation of the optics box can be coupled with a galvo-scanner that is fixed relative to the optics box.

In certain embodiments, the optics assembly may be mounted on a motorized stage that allows motion up and down perpendicular to a powder layer on a build surface in conjunction with motorized motion in the other axes. This may allow for improved focusing of the output beams as the beam is scanned back and forth with a galvo-scanner. Alternatively, the optical path in the optics assembly can include an auto-focusing array to enable fast dynamic focal length adjustment. This may allow for greater focal length adjustment to accommodate a wider galvo-scanning range.

Depending on the embodiment, a linear array of laser energy pixels (i.e., a line array) may have a uniform power density along the long length of the line array. In some instances, the line output pixel array can have a non-uniform power density along the long length of the line array by setting different power output levels for each pixel's associated laser energy source. Moreover, individual pixels on the ends of the linear array can be selectively turned off or on to produce a line array with a shorter length or longer length in the long direction. In some embodiments, all pixels except for a single pixel can be selectively turned off to obtain a single point pixel for fine feature profiling. In certain embodiments, the linear array can be broken into multiple smaller linear arrays in which the power density along each smaller linear array is the same. Alternately or additionally, the multiple smaller linear arrays can have different power densities that are uniform in each smaller array but different from array to array. In some instances, the multiple smaller linear arrays can have different power densities along each smaller array as well as different power densities between each small array.

Moreover, in some embodiments, the power levels of the various pixels in a linear array of laser energy may be independently controlled throughout an additive manufacturing process. For example, the various pixels may be selectively turned off, on, or operated at an intermediate power level to provide a desired power density along the length of the linear array.

According to some aspects of the current disclosure, the optical path of the incident laser beams after exiting the optical fibers may be important to obtain a uniform line shape on a powder surface. In some embodiments, an optical path of an additive manufacturing system includes a lens array including one or more micro-lenses (e.g., one or more micro-lens arrays) followed by one or more objective lenses. All beams from the independent laser energy sources pass through the same set of lenses in the lens array and the same objective lenses within an optics assembly. As described in more detail below, the lens array (including the one or more micro-lenses) may be arranged to collimate the laser energy output from each optical fiber source and transform the beam shape from a round beam profile with a Gaussian power distribution into a rectangular beam profile with a uniform power distribution in both axes (e.g., a top-hat power distribution). In this manner, the lens array may transform the laser energy output into an array of rectangular laser energy pixels. The objective lens(es) may be arranged to define a focal length for the combined line array and serve to demagnify the output from the lens array. This demagnification changes the pixel spacing from the initial spacing, which is set by the distance between the adjacent fibers in a fiber holder, down to a desired pixel spacing on the powder surface. For example, the objective lenses may be arranged to demagnify the array such that there is no spacing between adjacent pixels.

According to some aspects, a laser line output from an optics assembly may be a linear array comprising two or more rectangular pixels where the line is longer than it is wide when all of the pixels are in an on state. For example, in a system with two laser energy sources, if both lasers are being controlled to output the same laser power, then the power density over the length of the line is substantially uniform. Alternately the power levels of these two pixels can be controlled to be at different levels resulting in a line output with varying power density over the length of the line. In other embodiments, more than two pixels may be utilized to achieve a longer laser line. In some such embodiments, the power density over the length of the line may be kept uniform by controlling each pixel to have the same power output. Alternately, any combination of power density along the line may be obtained by independently controlling the pixels to have different power levels.

Figure 2:
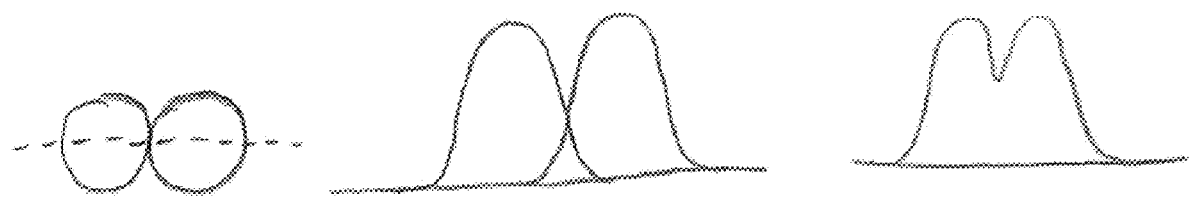
FIG. 2 is a schematic representation showing the power density of two adjacent round beams having Gaussian power densities.
Figure 3:
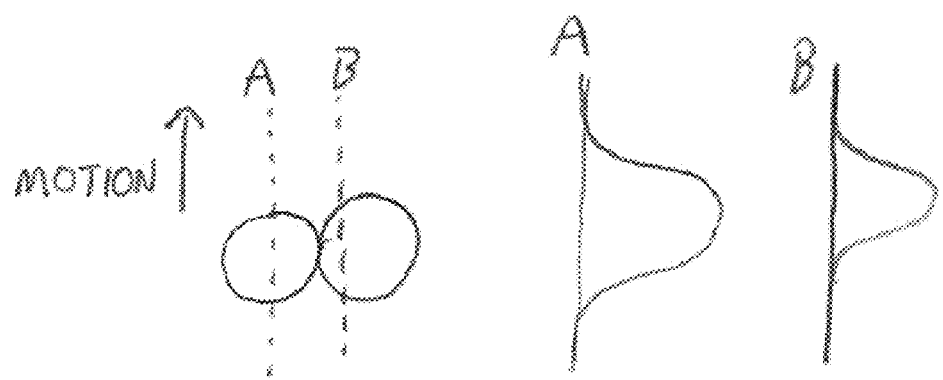
FIG. 3 is a schematic representation of the power densities at different positions of round beams having Gaussian power densities.

The inventors have appreciated that the transformation of the beam shape output from each laser energy source from a round Gaussian profile to a square top hat profile is important to enable multiple track single pass melt pool stability on the powder surface. For example, FIG. 1 shows a round beam with a Gaussian power density around its centerline. If two round Gaussian beams are put adjacent to each other as shown in FIG. 2, the power densities combine depending on the exact beam power distribution. The combined power density on a line through the centers of both round profiles sums to that shown in the right graph in FIG. 2. The combined power density has defined peaks and valleys and is not uniform. If these two spots are moved in a direction orthogonal to their stacked direction as shown in FIG. 3, then different tracks on the powder surface will be exposed to different power profiles depending on the position of the track relative to the incident beam's centerline. The track that is directly on the centerline of an individual round beam (track A in FIG. 3) will see a wider beam shape with a higher peak intensity compared to a track that is offset from the centerline of an individual round beam (track B in FIG. 3). The most extreme difference for different tracks will be between a track on an individual beam centerline and a track at the point where two adjacent round beams intersect. This difference in effective incident beam width and peak power density for different tracks under the travelling line will result in different melting rates and melt pool instabilities such as those previously discussed.

Figure 4:
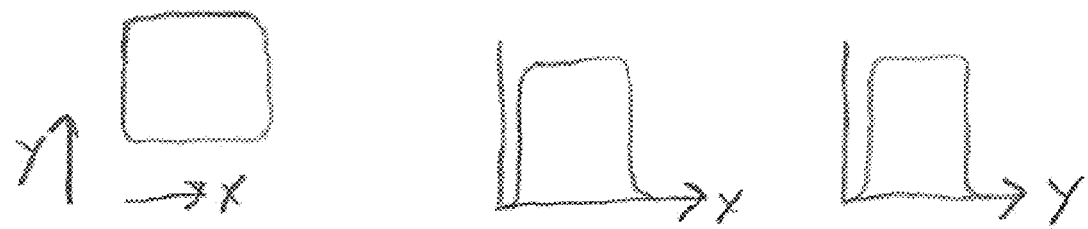
FIG. 4 is a schematic representation of a rectangular beam with a uniform power density.
Figure 5:
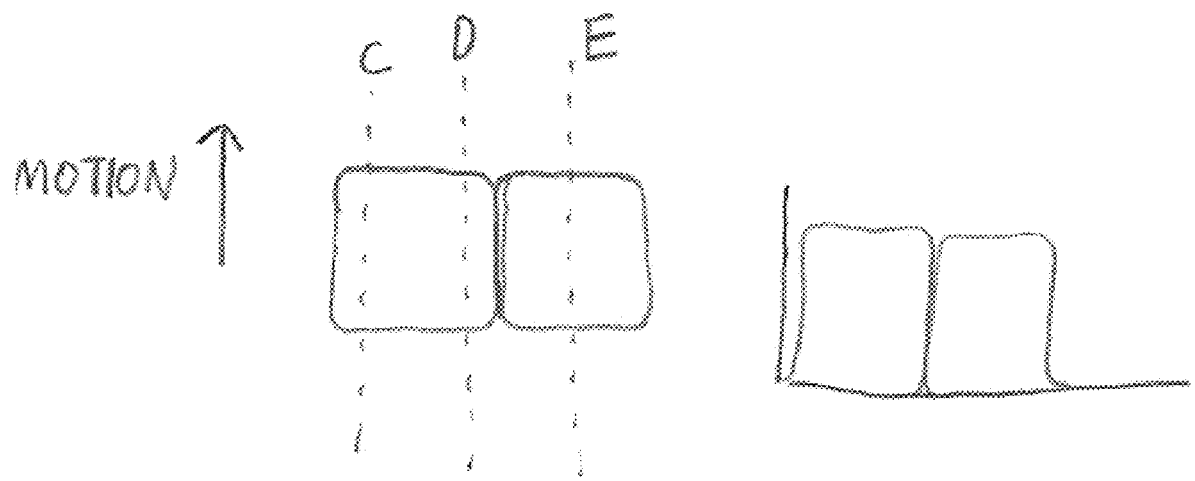
FIG. 5 is a is a schematic representation of the power densities at different positions of rectangular beams having uniform power densities.
Figure 6:
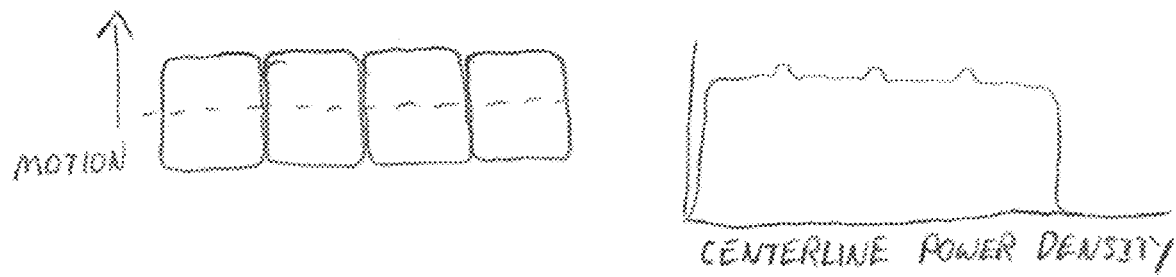
FIGS. 6-7 depict schematic illustrations of the incident energy profiles of a linear array of rectangular pixels having uniform power densities.
Figure 7:
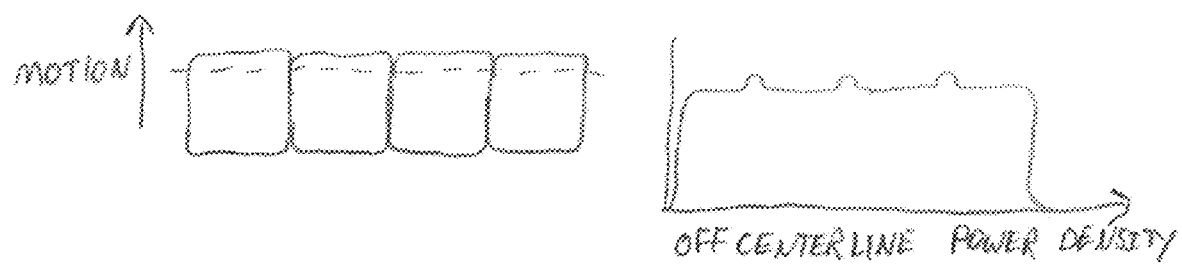

In contrast to the round Gaussian beam shape discussed above, if the output from each independent laser energy source is shaped (e.g., using one or more micro-lenses) into a rectangular beam shape with a uniform power density (i.e., a top hat profile), then the resulting beam shape and power density is that shown in FIG. 4. In both the X and Y directions of the resulting rectangular beam shape, the power profile is substantially uniform. If two rectangular profiles are then placed adjacent and moved orthogonally to their long stacked length, then the power profiles of the adjacent beam profiles combined to provide a substantially uniform profile both across the long length of the line projection as well as across the short width of the line. This means that each track line (tracks C, D and E in FIG. 5) sees the same effective beam width and peak power as all other tracks as the line is scanned over the powder surface.

Figure 8:
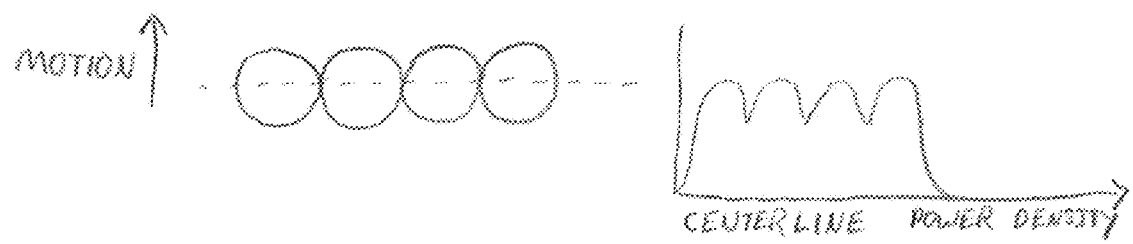
FIG. 8-9 depict schematic illustrations of the incident energy profiles of a linear array of round pixels having Gaussian power densities.
Figure 9:
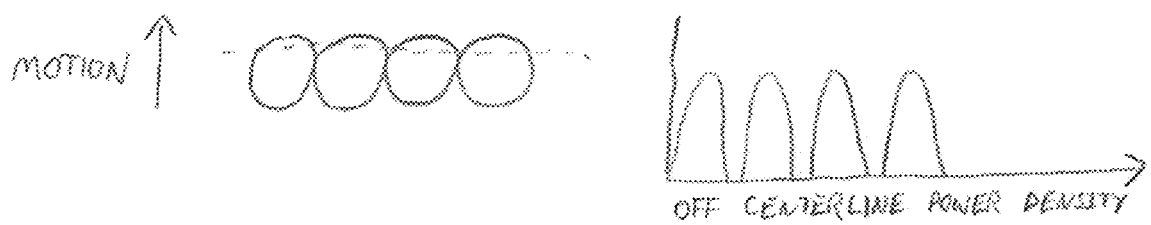

Moreover, the inventors have appreciated that the uniformity of net power exposure of the incident laser energy line on the powder surface is important to produce high quality fused material tracks. As illustrated in FIGS. 6-9, a line consisting of multiple adjacent rectangular top hat profile pixels (FIGS. 6-7) produces a more uniform incident energy profile at all points in the scanned beam compared to a similar line consisting of adjacent round Gaussian pixels (FIGS. 8-9). With the rectangular top hat profile, not only is the centerline power density across the width of the line more uniform, but the off-centerline power density across the width of the line is more uniform. Even if a round Gaussian profile is converted to a round top hat profile (i.e., a round beam shape with a uniform power density), while the centerline power density profile between the rectangular and round beam shapes will be the same, the off centerline power density of the rectangular beam shape will be much more uniform than for the off centerline power density of the top hat round beam shape. Accordingly, in all cases, a rectangular top hat beam shape for each pixel will produce a more uniform power density at all points in a multi pixel line than a similar multi pixel line that consists of either Gaussian or top hat profile round beam shapes. Moreover, a more uniform power density may produce less melt pool instability and may allow for greater processing speeds, higher power densities and a wider process window.

According to some aspects, it may be important to operate an additive manufacturing process with the powder surface positioned within the focal point. For example, this may ensure the highest possible power density as the incident beam area is minimized on the powder surface. This also may minimize the size of each pixel and allows for the highest possible resolution of the resulting melt pool and fused part features. Operating outside the focal point may result in low effective power densities of the incident beam, which can result in requiring slower scanning speeds and may slow net processing rates. Alternatively, higher power laser energy sources may be required to operate at the same speed to obtain similar processing rates. These high net powers may cause melt pool instabilities, as discussed above, which would then also require a lower processing speed to operate within a stable set of process parameters. Operating within the focal point also may aid in keeping the power density profile across the width of the multi-pixel line substantially uniform. With operation outside of the focal point, the pixels may overlap and the power density profile across the length of the line may have undesirable peaks and valleys. Depending on the particular embodiment, the type, number and spacing of the objective lenses depends on the desired degree of demagnification, desired focal length and desired size of the focal point.

Figure 10:
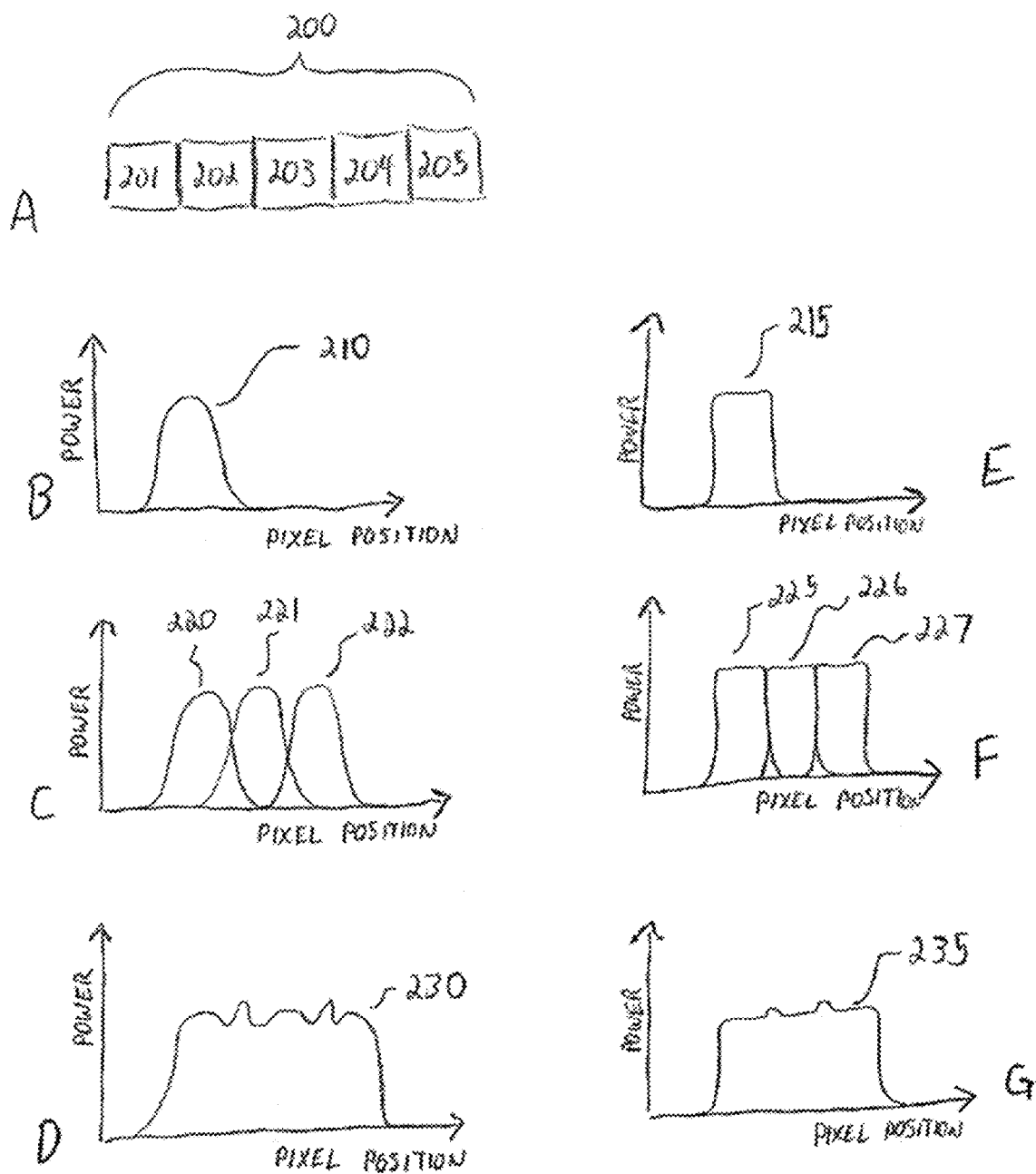
FIG. 10 depicts schematic representations of power densities of linear pixel arrays, according to some embodiments.

Another example of the impact of the power distribution in a linear array of laser energy pixels is described with reference to FIGS. 10-13. Specifically, FIG. 10 depicts a linear array 200 that may be projected onto a surface (e.g., onto a powder bed surface), and the linear array comprises a series of adjacent rectangular laser energy pixels 201-205. As discussed previously, the power density across the width of an individual pixel can take on different distributions, and the interaction of the power densities of the different distributions of adjacent pixels will determine the uniformity of the power density of the linear array 200. If the power density distribution for an individual pixel takes on a Gaussian form 210, then when multiple adjacent pixels are set to the same power level, the individuals pixels 220, 221, 222 combine to form a single output line 230 with an output power density distribution that is the spatial sum of the individual pixels. The variation in density over this single output line 230 is due to the variation within each pixel as well as the sum of the overlap area between pixels. If the power density distribution for an individual pixel takes on a uniform distribution (i.e., a top hat form) 215, then when adjacent pixels in the linear array 200 are set to the same power level, the individual pixels 225, 226, 227 combine to form a single output line 235. Since there is less variation across the width of each individual pixel and there is less overlap area between adjacent pixels compared to the Gaussian pixels, the resulting output line 235 has a more uniform power density distribution compared to line 230 from the Gaussian pixels. The same applies for power distribution across the width of the single output line. A top hat profile 215 across the width of the pixels will result in a more uniform power density distribution than for a Gaussian distribution 210 across the width.

Figure 11:
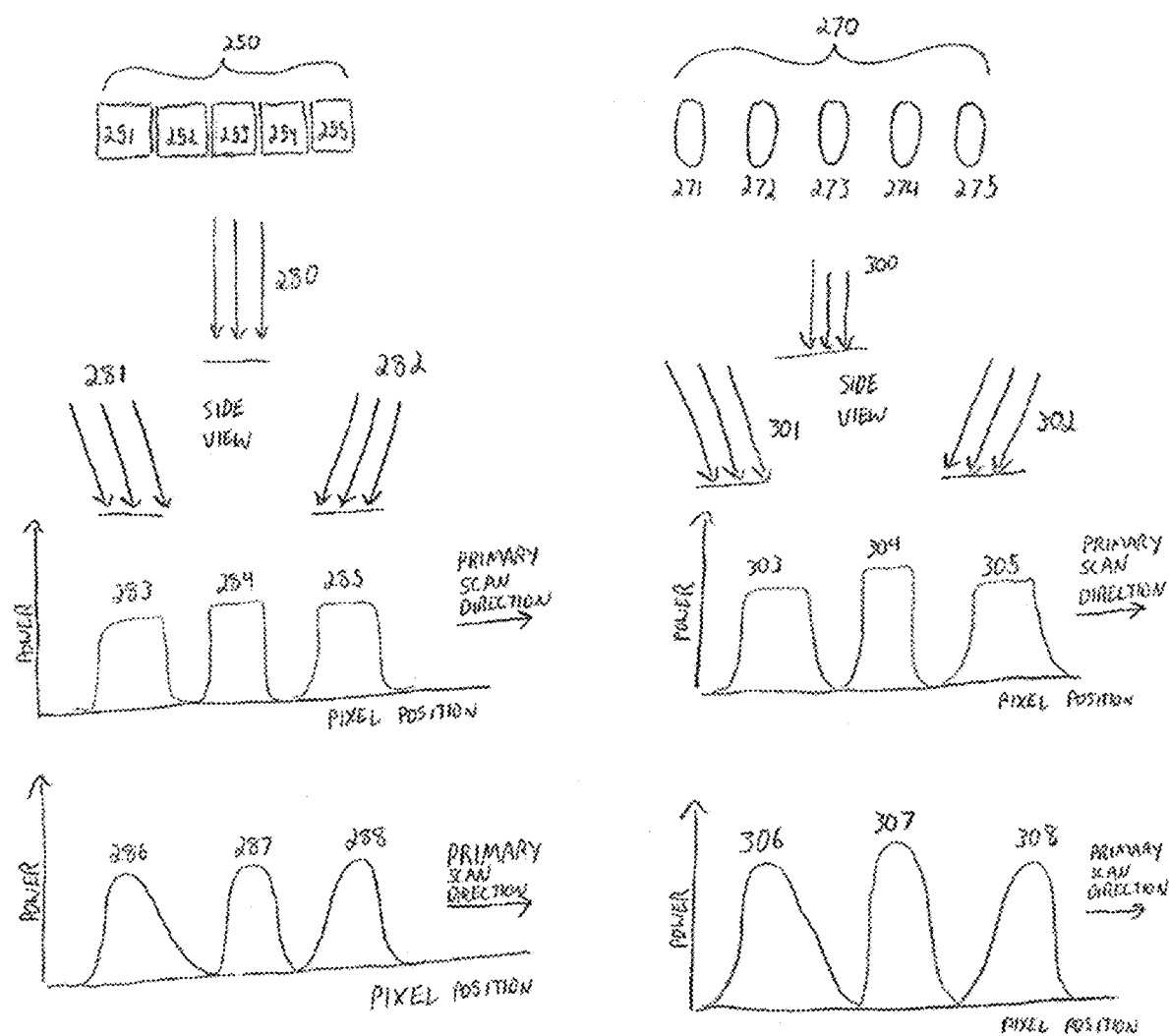
FIG. 11 depicts schematic representations of power densities of linear pixel arrays and fixed spot arrays.

As illustrated in FIG. 11, using a single output linear array 250 that comprises independently controllable laser energy pixels 251-255 has advantages compared to the use of individual fixed spot arrays 270 where the individual laser energy inputs have to be angled compared to each other in order to accommodate the size of their optical arrays. In the single output linear array 250, individual pixels are all incident upon the surface (e.g., a powder bed surface) at the same angle. This angle can be normal to the surface (280) or at an acute angle to the surface either away from the primary scan direction (281) or towards the primary scan direction (282). All the pixels maintain the same angle at all times. For this case with a top hat power density profile across the width of the line, the power density for an acute angle (283, 284) has a lower peak value but a wider width, depending on the actual incident angle. In contrast, for a Gaussian distribution, the power density across the width of the line shows either an elongated lead-in 286 or elongated tail 288 with an acute incidence angle compared to a normal incidence pixel 287.

Moreover, with individual spot arrays 270, due to size limitations of their optical arrays, incident beams will always consist of combinations of acute incident angles both towards (301) and away (302) from the primary scan direction and may also include normal incidence spots (300). For individual spots with top hat power density distributions, this results in similar power distributions for spots with the same incidence angles 303, 305, even from different directions, but different power densities for normal spots 304. For Gaussian power distributions, different incidence angles will result in some spots scanning with an elongated lead in 306 and an elongated tail 308 at the same time and potential normal spot incidence without a lead in or tail 307. This prevents scan velocity optimization for the different incidence beams. As the incidence angle increases, the difficulty in managing the different scan power density profiles increases.

Figure 12:
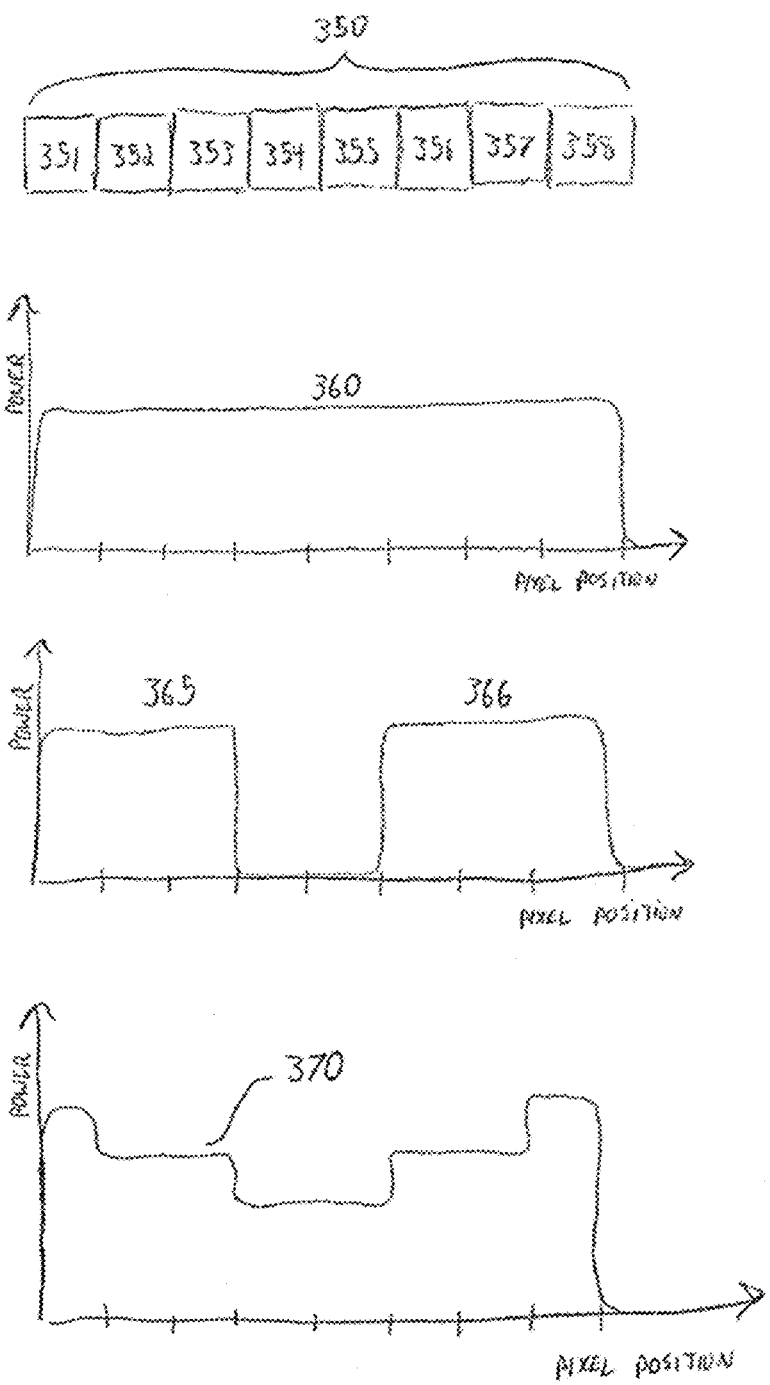
FIG. 12 depicts schematic representations of power density outputs of a linear pixel array, according to some embodiments.

FIG. 12 shows a line array with different possible outputs. The upper plot shows a potential array of 8 pixels that form a line. Each pixel in this line can be set to the same power density to produce a full width line with a uniform power density along the length of the line as shown in the upper most plot of FIG. 12. In some instances, individual pixels may be turned off to produce shorter individual lines as shown in the middle plot of FIG. 12. Alternatively, the power level of each pixel can be set individually to produce a line of almost any power density along the length of the line or along multiple smaller lines. As the total line width increases and the pixel count increases, the ability to set a non-uniform power density along the length of the line can be useful for adapting the process to account for edge effects. Pixels on the powder bed surface that are adjacent on both sides to other pixels may require less total incident power to obtain a stable melt pool condition than pixels on the edge of a line. This is due to convective and conductive thermal losses at the edge of the line that have to be accommodated with more power. Also, the presence or lack of fused material under an individual pixel from the previous scan layer can affect the local thermal characteristics of the melt pool for a given pixel. One solution to these edge effects and previous scan effects is to set a custom power density across the length of the line depending on the boundary conditions for that pixel at that point in the scan. The bottom plot in FIG. 12 illustrates a line power density with higher power at the two edges and a stepped profile across the remaining pixels of the line.

Figure 13:
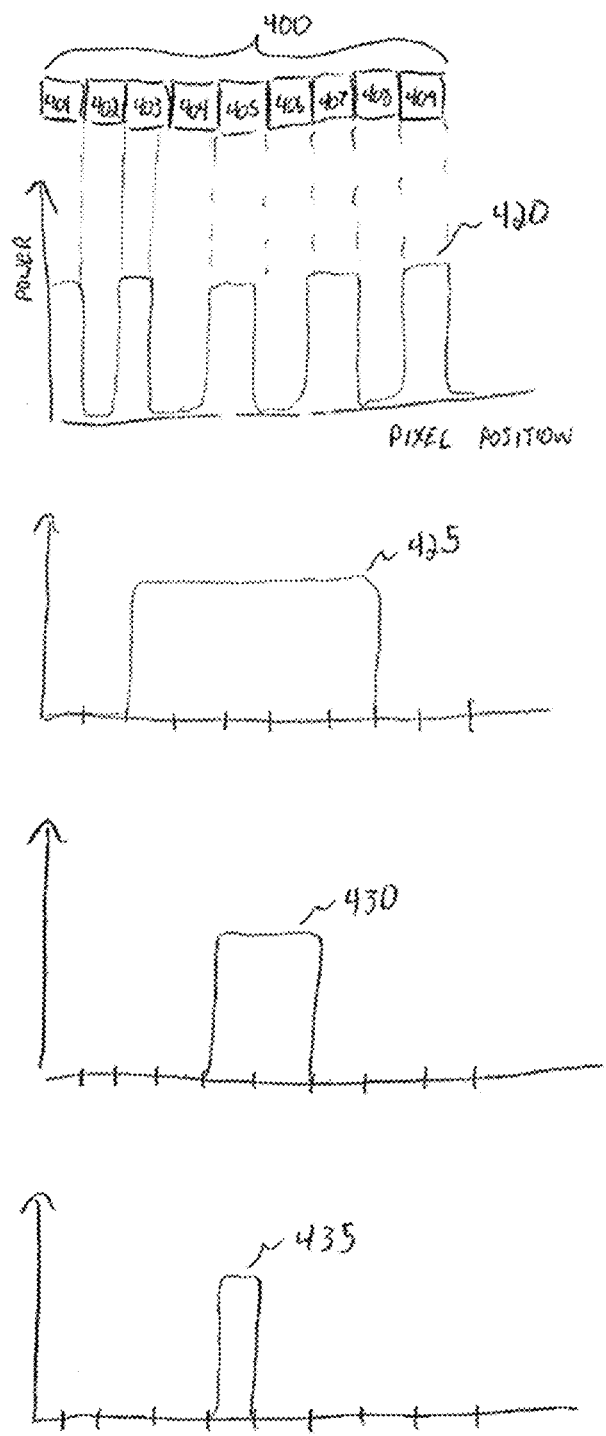
FIG. 13 depicts schematic representations of power density outputs of a linear pixel array, according to some embodiments.

FIG. 13 depicts another example of the ability to turn off individual pixels within a linear array. Similar to the arrangements discussed above in relation to FIG. 12, this may allow for the use of different length line segments as well as multiple shorter segments. As shown in the top plot of FIG. 13, a linear array can be divided down to the resolution of an individual pixel. By turning on or off individual pixels at various points during a scanning motion of an optics assembly, the ultimate resolution of a 3D feature formed from a powder bed fusion process is that of a single pixel. Line lengths can also be formed from multiple pixels as shown in the middle two plots of FIG. 13 and down to a single pixel as shown in the bottom plot of FIG. 13. Single pixel resolution can be generated from any of the pixels in the linear array. In this way, fine resolution features at any point in the scanning motion of the linear array can be generated by activating any single pixel at any point. Single pixel resolution can also be obtained from a single scan of a line array where the features are at an angle to the direction of the scanned motion by turning on and off sequential adjacent pixels at the optics unit is moved over the powder bed surface.

Figure 14:
FIG. 14 is a schematic representation of a linear pixel array at a focal point.
Figure 15:
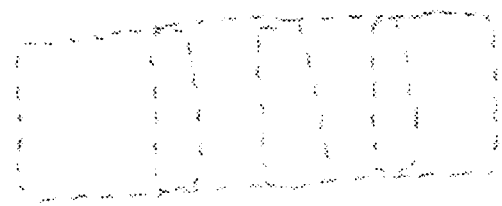
FIG. 15 is a schematic representation of a linear pixel array away from a focal point.

As described in more detail below, one or more objective lenses after the lens array including one or more micro-lenses may define a focal length and focal point of the combined beams (e.g., a linear array of laser energy pixels). The focal length of the beams is the distance from the final objective lens of an optical assembly to a focal point. At the focal point, each beam or pixel is at its minimum dimension and each beam is directly adjacent to a neighboring beam. For example, there may be no spacing between adjacent beams such that the edges of adjacent laser energy pixels are in contact with one another. This condition at the focal point is schematically illustrated in FIG. 14. Away from the focal point of the beams (in either direction along the beam path), the dimensions of the beams increase and the beams may start to overlap each other as shown in FIG. 15. The focal point is typically defined as a region along the beam path where the beam size is within a defined range. In this example, it can be defined as a region in the beam path where the rectangular profile dimension is less than a predetermined value. In some instances. The focal point may be defined as a length along the beam path and not an actual single point and is defined to start when the size of an individual beam (e.g., a pixel dimension) decreases below a defined focus size and ends when the beam expands back above the defined focus size.

In some instances, a rectangular top hat beam shape may be obtained without the use of a lens array including micro-lenses. For example, if a square optical fiber is used to deliver the power from the independent laser energy sources, then the output from the fibers at the fiber holder is already in a square top hat shape with uniform power density in both directions of the square. The independent outputs from the square optical fibers mounted in a fiber mount can be directed straight into the objective lens stack for demagnification and focusing on the fiber surface.

Figure 16:
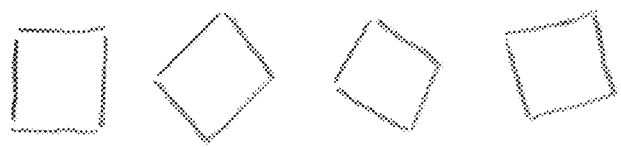
FIG. 16 is a schematic representation of a pattern of pixels produced by rotationally misaligned square fibers.
Figure 17:
FIG. 17-18 depict a schematic representation of rectangular beam profiles shaped from round beam profiles, according to some embodiments.
Figure 18:
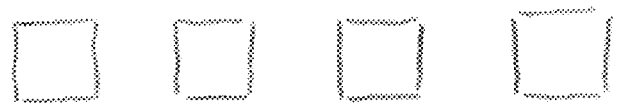

However, the inventors have appreciated that the use of square fibers may place additional requirements on the alignment and mounting of the fibers in the fiber mount. In particular, with a square fiber where the square top hat shape is established by the fiber itself, the fiber mount must establish spacing and axial alignment, as well as rotational alignment between the square shapes. If the square fibers are not rotationally aligned, the resulting pattern of pixels will be similarly misaligned as illustrated in FIG. 16. In contrast, with round fibers and a lens array including one or more micro-lenses to shape the round beam into rectangular beams as illustrated in FIGS. 17-18, the orientation of the fibers around their axis is not a critical parameter. Any orientation of the round fibers is suitable as the ultimate rectangular shape of the pixels and orientation of the pixels is established and maintained by the array of lenses. Since each micro-lens of the lens array may be made as single monolithic part, maintaining alignment between the rectangular beam shapes is inherent in the manufacturing of each lens and can be controlled. Accordingly, after the rectangular pixels pass through the objective lens(es), the output from the fiber optical assembly will produce a uniform pixel array on the powder surface without having to rotationally align the fibers.

Referring now to FIGS. 19-28, specific non-limiting embodiments of additive manufacturing systems according to the current disclosure are described in further detail. It should be understood that the various systems, components, features, and methods described relative to these embodiments may be used either individually and/or in any desired combination as the disclosure is not limited to only the specific embodiments described herein.

Figure 19:
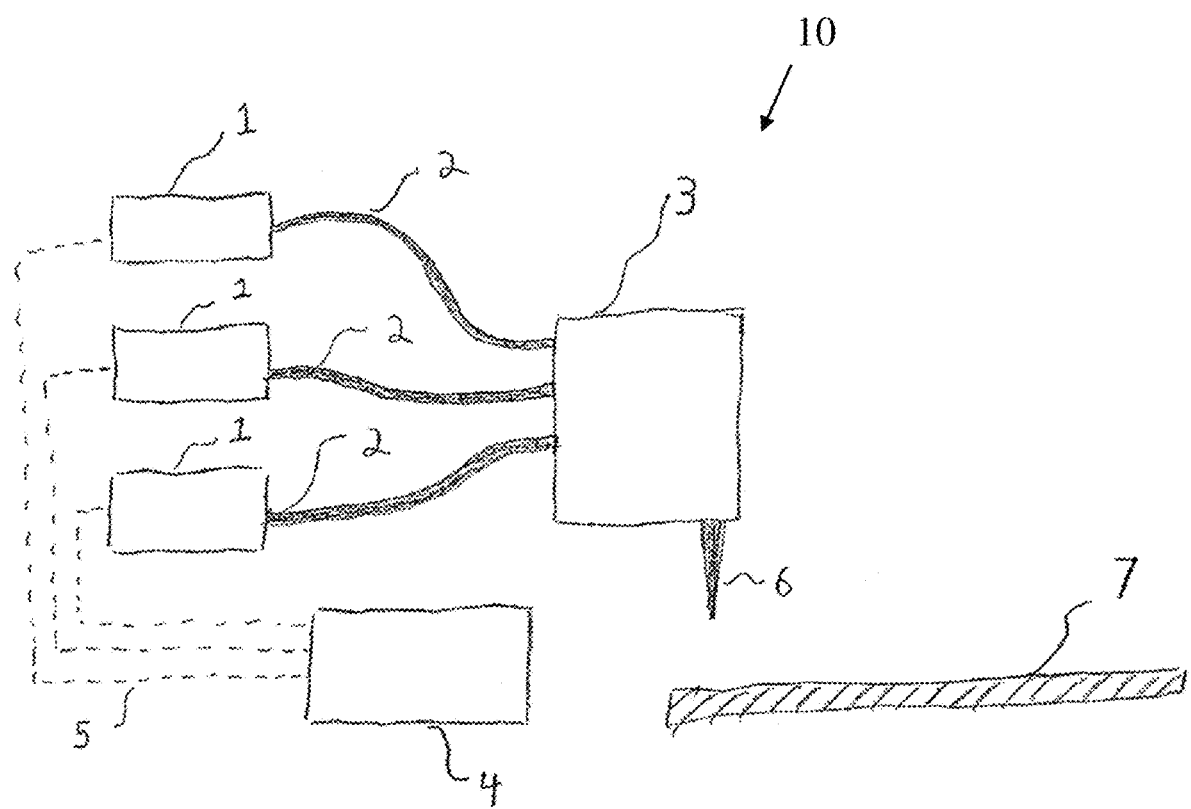
FIG. 19 is a schematic representation of one embodiment of an additive manufacturing system.

FIG. 19 depicts one embodiment of an additive manufacturing system 10. The system includes two or more independent laser energy sources 1 coupled to associated optical fibers 2. For example, the independent laser energy sources 1 may be Nd:Yag fiber lasers with maximum output powers of 10-2000 W. In some instances, the maximum output powers of each laser energy source may be 200-1000 W. In other embodiments, the laser sources may include fiber coupled diode lasers. Each independent optical fiber 2 for each independent laser energy source 1 is routed to an optics assembly 3, such that a first end of each optical fiber is coupled to an associated energy source, and a second end of each optical fiber is received in the optics assembly. As described in more detail below, the optics assembly 3 produces a combined optical output 6 which is directed onto a powder bed surface 7 located on a build surface.

Each independent laser energy source 1 is connected to a central control unit 4 using control cables 5. The central control unit 4 is configured to independently control each laser energy source 1. For example, the central control unit may provide an on/off signal and a power output signal to each independent laser energy source. The power output signal to each independent laser energy source 1 can control the output power from a minimum power level up to the maximum output power level of the laser energy source. For example, the output power range may be from 10% to 100% of the maximum power output of each independent laser energy source 1.

Figure 20:
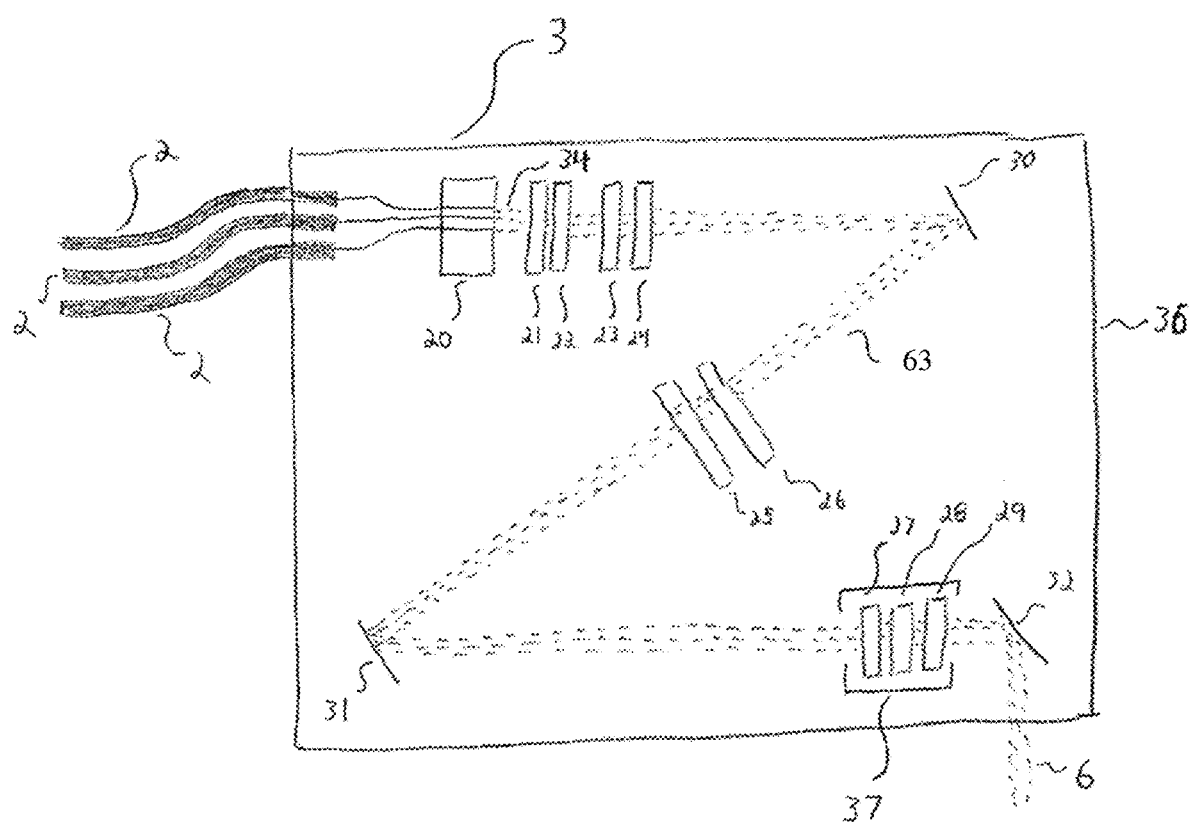
FIG. 20 is a schematic representation of one embodiment of an optics assembly.

FIG. 20 depicts one embodiment of an optics assembly 3. Within the optics assembly 3, an end of each optical fiber 2 is received into a fiber mount 20 (see FIG. 21). The fiber mount 20 fixes a spacing between adjacent optical fibers 2 and ensures that the axes of the optical fibers 2 are parallel and aligned. On an output side of the fiber mount 20, the ends of the optical fibers 2 are cut, cleaned and polished to ensure a uniform and consistent beam exit from each individual optical fiber 2. The combined laser output 34 from the individual optical fibers 2 is directed towards a series of optical lenses 21-29. The combined laser output 34 forms a line from the adjacent independent laser sources 1 projections through the individual optical fibers 2 that are linearly arranged in the fiber mount 20.

Figure 21:
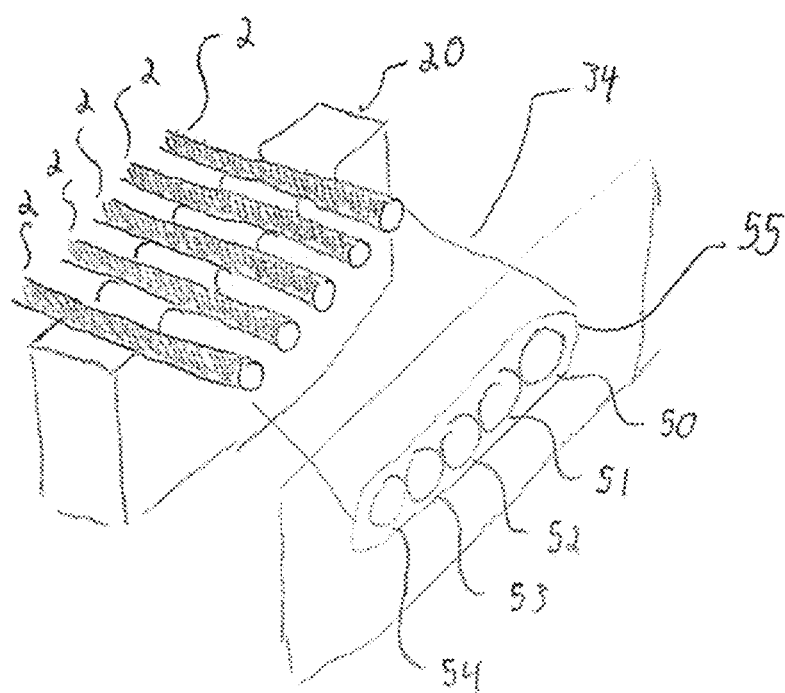
FIG. 21 is a schematic representation of one embodiment of a fiber mount.

As best illustrated in FIG. 21, when all the independent laser sources 1 are on, the combined laser output 34 forms a continuous line 55 comprising individual pixels 50-54. At this point along the optical path within the optics assembly, the adjacent pixels 50-54 may overlap or the pixels may be separated from one another. The degree of overlap of the pixels 50-54 in the combined laser energy output 34 may depend on the optical path that pixels 50-54 are passed through after the laser energy output exits the fibers 2 at the fiber mount 20. In this manner, any suitable number of independent laser energy sources 1 can be coupled into a single combined laser output 34. For example, in some embodiments, the number of independent laser energy sources 1 is in the range of 2-20, 5-50, or 10-100.

Figure 22:
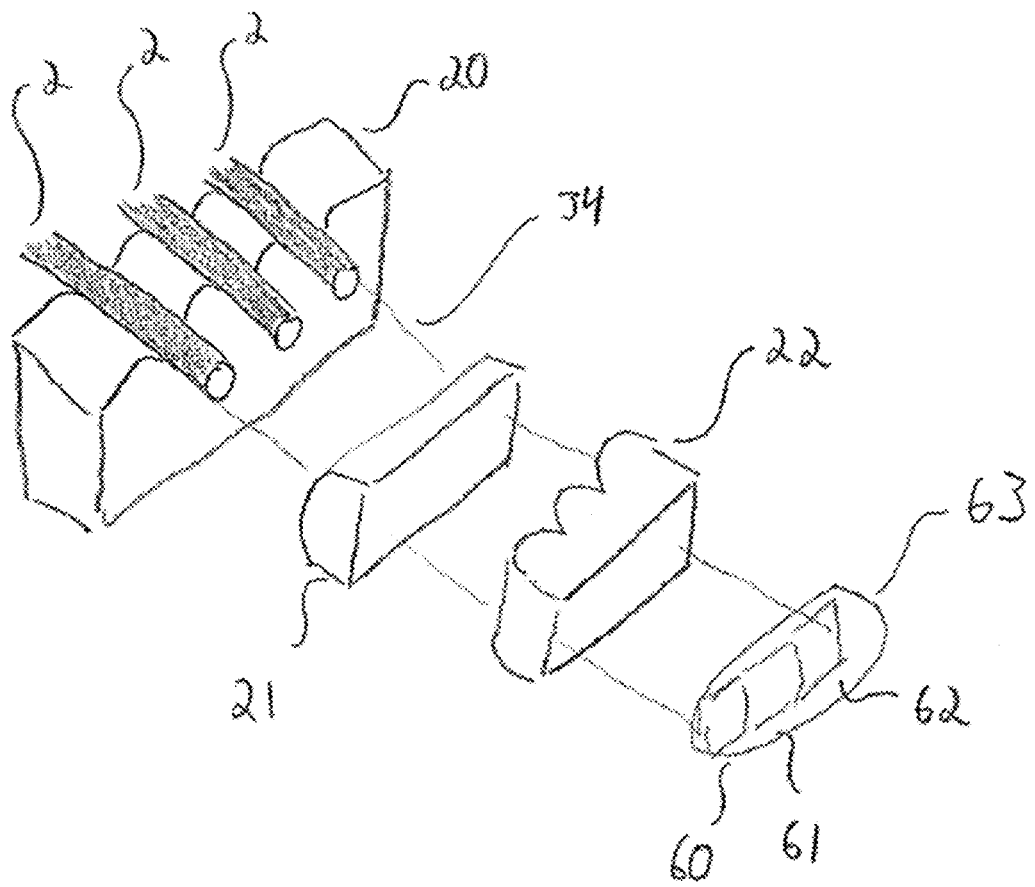
FIG. 22 is schematic representation of one embodiment of a lens array.

The combined laser output 34 within the optics assembly 3 is passed through a series of lenses 21-29. The number and type of lenses 21-29 is dependent on the desired output shape and focal length of the combined optical output 6 from the optics assembly. As illustrated in FIG. 22, the first lens 21 is a fast axis collimator followed by a slow axis collimator 22, which are used to form the combined laser output 34 into a line shape with a controlled overlap between adjacent pixels 60, 61, 62 where each pixel is produced by the output of an independent laser energy source 1. The fast axis collimator 21 and slow axis collimator 22 are also used to modify the beam shape of each independent laser source 1, for example to transform round beam profiles from the optical fibers into rectangular laser energy pixels. The resulting pixel shapes 60, 61, 62 still form a continuous output line 63 when all the independent laser sources 1 are turned on. This continuous output line 63 is then passed through an additional series of lenses 23-29 (see FIG. 20) that shape and focus the output line within the optics assembly 3 to form a controlled combined optical output 6.

The optics assembly 3 may contain mirrors 30, 31, 32 arranged to fold the continuous output line of laser energy 63. In some cases, this folding helps to keeps the dimensions of the optics assembly 3 limited. In the depicted embodiment, the continuous output line 63 is folded two times in the optics assembly 3. However, it should be understood that the output line 63 may not be folded, may be folded once, three times, or any other suitable number of times as the current disclosure is not limited in this regard. The optics assembly 3 further includes a frame 36 that contains mounting and alignment features for the fiber mount 20, lenses 20-29 and mirrors 30-32. The optics assembly 3 also may include an adjustable focus array 37 with a set of adjustable lenses 27, 28, 29 that can adjust the focal length of the combined optical output 6.

Depending on the particular embodiment, the combined optical output 6 of the optics assembly 3 may exit the assembly at any suitable orientation, such as at a right angle relative to the entry of the individual optical fibers 2, parallel to the individual optical fibers 2, or at an arbitrary angle relative to the optical fibers 2.

Figure 23:
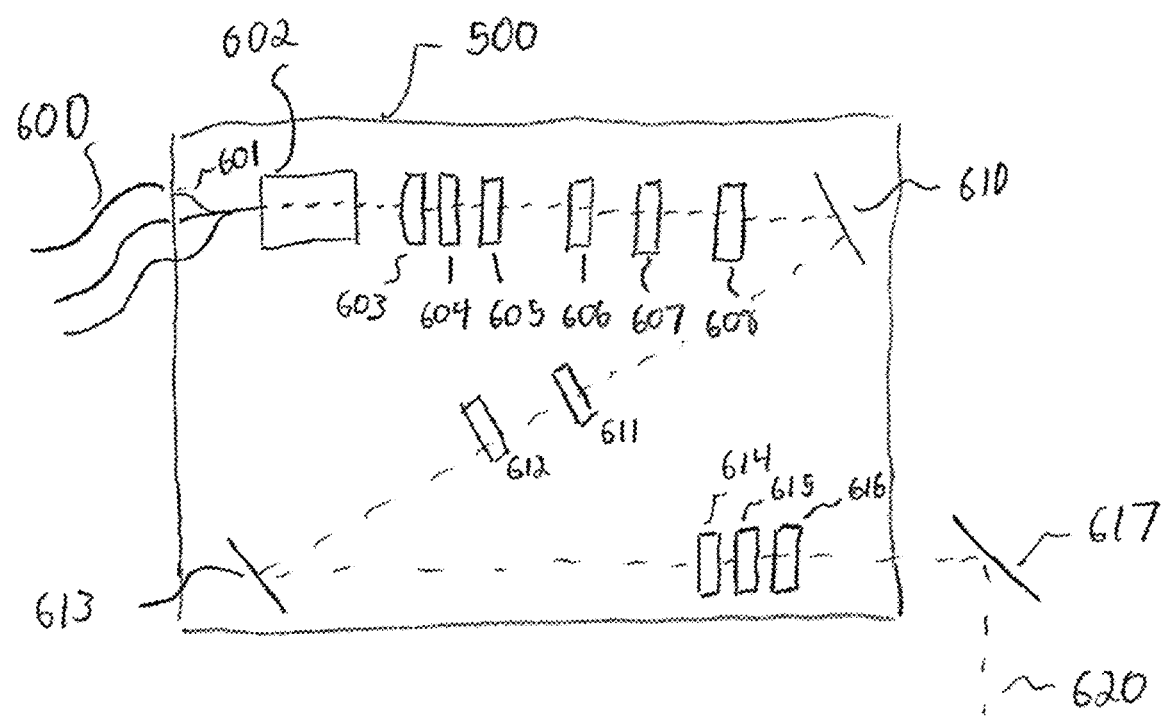
FIG. 23 is schematic representation of another embodiment of an optics assembly.

FIG. 23 depicts another embodiment of an optics assembly 500. In this embodiment, the independent optical fibers 600 enter on one side of the optics assembly 500 and the ends 601 of the optical fibers are received by the fiber mount 602. The fiber mount ensures that the ends of the individual fibers 601 are held securely and are aligned and parallel within the optical assembly. Depending on the particular embodiment, the spacing between individual fibers in the fiber mount may be between about 500 microns and about 10 mm. For example, in some embodiments, the spacing between adjacent fibers may about 1 mm or about 2 mm. The ends of the individual fibers 601 are cleaved, ground and polished at the exit of the fiber mount 602. The beam outputs from the ends of the individual fibers 601 are then directed at a cylindrical lens 603 that collimates the beams in a first direction normal to a plane that passes through the centers of the ends of the fibers 601. The beams then pass through a cylindrical micro-lens array 604 that collimates the beams in a second direction orthogonal to the first direction. The beams then pass through another cylindrical lens 605 that shapes the beams from a round Gaussian to a rectangular top hat shape in the first direction. The beams then pass through a cylindrical micro lens array 606 that shapes the beams from a round Gaussian to a rectangular top hat shape in the second direction. Subsequently, the beams then pass through cylindrical micro-lenses 607 and 608 that produces a Fourier transformation in the first and second directions, respectively. At this point the beam can be folded using a mirror 610 or the beam can be allowed to continue in a straight path. The beams then pass through a set of spherical objective lenses 611-616 that demagnify the beams and set a focal length and focal point. The beam path may be folded by a mirror 613 before, during or after passing through the objective lenses. The demagnification may be by a factor of 10:1 or 5:1 or 20:1 or any range thereof. The focal length may be set at 100 mm, 200 mm, 300 mm or any other suitable value by adjusting the objective lenses type and spacing. The exiting beam 620 from the final objective lens may be directed straight towards the powder surface, or may be directed towards the powder surface using a mirror or scanning galvanometer controlled mirror.

Although cylindrical lenses and micro-lenses are described above to collimate and shape the beam outputs, it should be understood that other types of lenses may be suitable. For example, in other embodiments, any suitable combination of cylindrical lenses, spherical lenses, and conical lenses may be employed to collimate and/or shape the beam outputs. Similarly, while spherical objective lenses have been described above, other lens shapes (e.g., cylindrical and/or conical lenses) may be employed for the objective lenses. Accordingly, it should be understood that the current disclosure is not limited to any particular lens shapes or combination of lens shapes.

Figure 24:
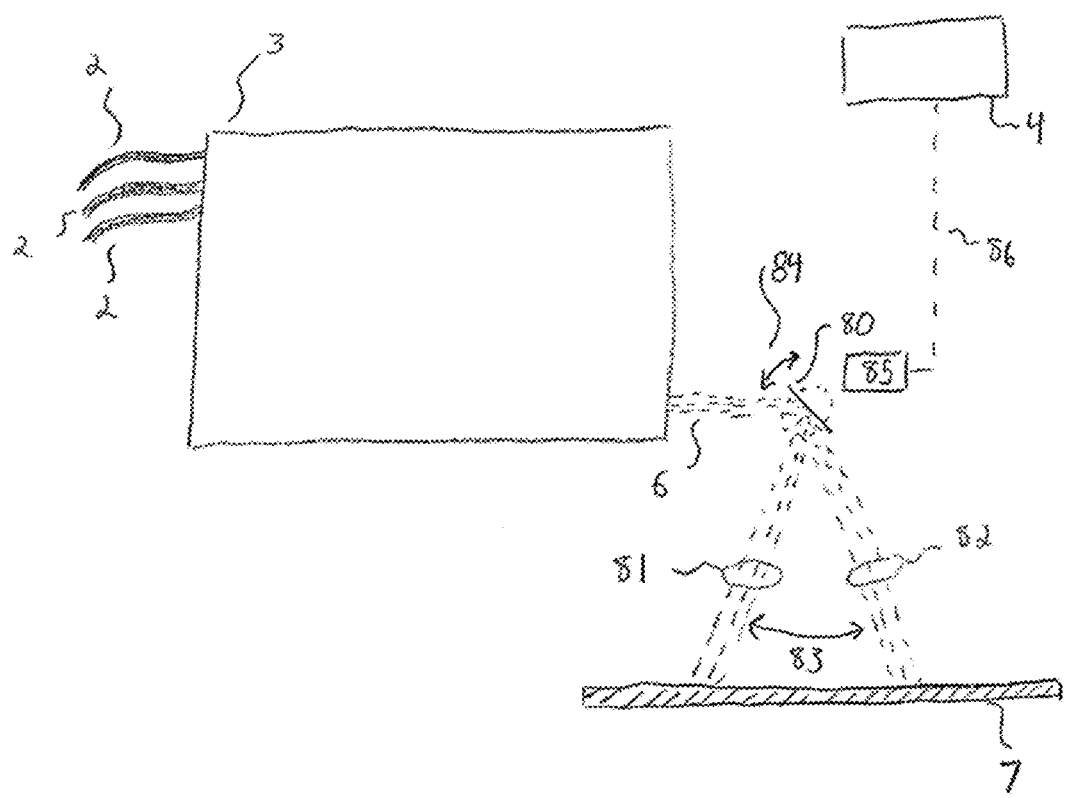
FIG. 24 is schematic representation of one embodiment of one embodiment of an additive manufacturing system including a galvanometer.

Referring now to FIG. 24, the combined optical output 6 may be directed towards a mirror mounted on a galvanometer 80. In the depicted embodiment, the combined optical output 6 is turned towards the powder bed surface 7 by the galvanometer mounted mirror 80. As the galvanometer mounted mirror 80 is rotated through an angle 84, the combined optical output 81, 82 (after reflecting off of mirror 80) is scanned over a distance on the powder bed surface 7 defined by an angle 83. The position of the galvanometer mounted mirror 80 is driven by a galvanometer controller 85 which is in turn connected by an electrical control cable 86 to the central control unit 4. The angle 83 through which the combined optical output 81, 82 can be scanned is dependent on the focal length of the combined optical output 6 from the optics assembly 3. In some embodiments, the use of an adjustable focus array 37 within the optics assembly 3 (see FIG. 16) enables a wider angle 83 for scanning the powder bed surface 7. In some instances, the optics box 3 with the galvanometer mounted mirror assembly 80 can also be moved relative to the powder bed surface 7, which may enable multiple modes of scanning.

Figure 25:
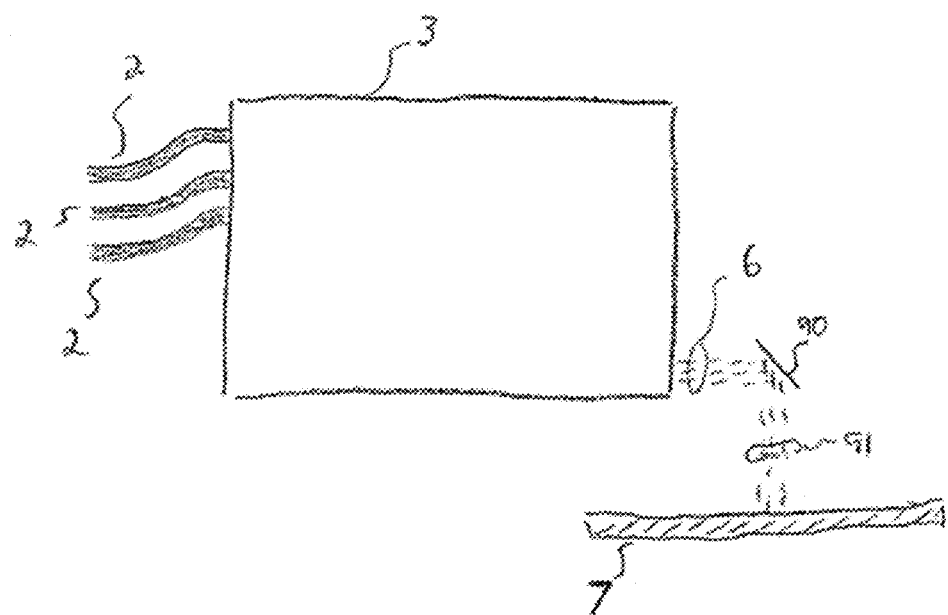
FIG. 25 is schematic representation of one embodiment of one embodiment of an additive manufacturing system including a fixed mirror assembly.

As depicted in FIG. 25, in some embodiments, the combined optical output 6 from the optics assembly 3 may be directed towards the powder bed surface 7 using a fixed mirror assembly 90 such that the optical output 91 is fixed relative to the position of the optics assembly 3. The optics assembly 3 can then be moved relative to the powder bed surface 7 to obtain a desired scanning pattern.

As discussed previously, the combined optical output from the optics assembly that is directed towards the powder bed surface is in the form of a linear array of two or more adjacent rectangular laser energy pixels formed from the output of the independent laser energy sources, and the linear array may be scanned over the powder bed surface to selectively melt a portion of the material on the powder bed to form a desired part.

Figure 26:
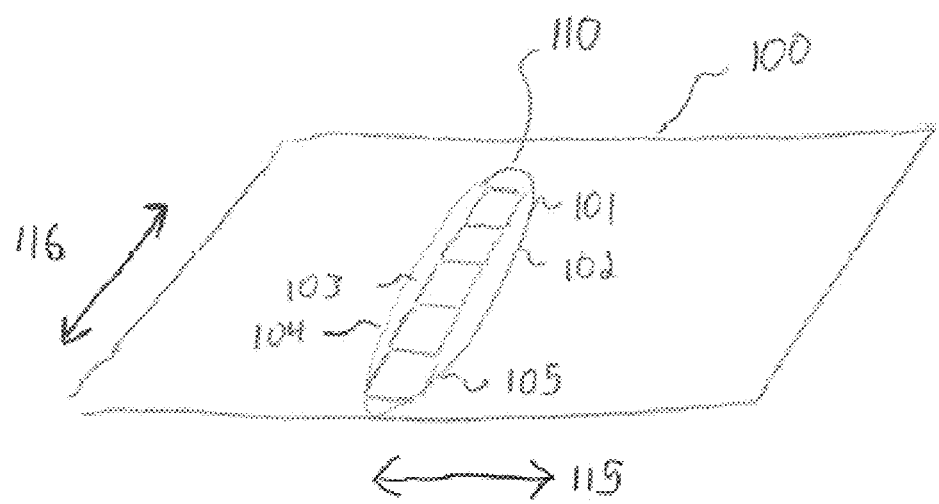
FIG. 26 is a schematic representation of a linear pixel array formed on a powder bed surface, according to some embodiments.

FIG. 26 depicts a schematic representation of a linear array 110 on a powder bed surface 100 that includes a plurality of individual adjacent rectangular laser energy pixels 101-105. Depending on the particular embodiment, the laser energy pixels may be shaped (e.g., via a lens array including one or more micro-lenses) to have any suitable size. For example, in some embodiments each rectangular pixel may have a width of about 50 microns to about 200 microns. In one embodiment, each pixel may have a width of about 100 microns. Moreover, the power level of each individual pixel 101-105 may be independently controlled by adjusting the output of its respective independent laser energy source. Each pixel 101-105 can also be independently turned on and off by controlling its associated laser energy source.

The resulting linear array 110 can be scanned over the powder bed surface 100 in at least a primary direction 115 that is perpendicular to the long dimension of the linear array 110 as well as in a secondary direction 116 that is parallel to the long direction of the linear array 110. For example, scanning in the primary direction 115 can be obtained by moving the optics assembly or by scanning the combined optical output from the optics assembly using a galvanometer mounted mirror assembly or other suitable arrangement. Moreover, in some instances, a combination of moving the optics assembly while scanning with a galvanometer mounted mirror assembly can also be used to scan the combined optical output over the powder bed surface in the primary direction. Scanning in the secondary direction 116 can be obtained by moving the optics assembly relative to the powder bed surface 100. It should be understood that simultaneous scanning in both the primary and secondary directions can be used to scan any desired pattern on the powder bed surface 100.

Figure 27:
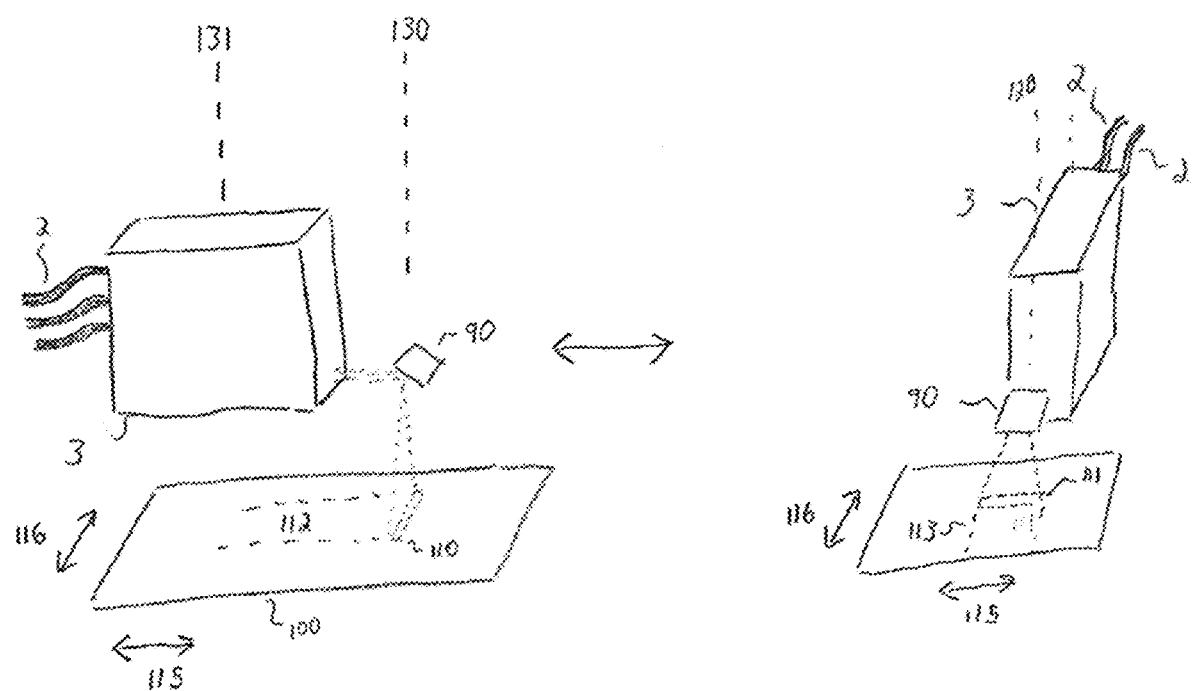
FIG. 27 is a schematic representation of one embodiment of an additive manufacturing system.

FIG. 27 depicts another embodiment in which an optics assembly 3 is mounted on a rotating stage that allows the optics assembly 3 to rotate about an axis. This arrangement allows the linear array 110 to be rotated on the powder bed surface 100 to a new position 111. In some instances, this may allow for subsequent passes on the powder bed surface to be made in different directions, which may cause the melt tracks on subsequent layers 112, 113 to be rotated at an angle to each other while enabling the full utilization of the line array in the scanning of both layers. For example, in some embodiments, the rotation angle of the optics assembly 3 between subsequent layers is between about 30° and about 90° (e.g., about 30°, about 45°, or about 90°). The axis of rotation of the optics assembly 3 may be aligned with an axis 130 passing through the center of the linear array 110. Alternatively, the axis of rotation of the optics assembly may be positioned away from the center of the linear array 110, such as along axis 131. In one such embodiment, the position shift of the linear array 110 can be calculated based on the rotational axis displacement from the center of the linear array 110. This offset can then be accommodated by applying an offset to the primary and secondary scan positions. In some embodiments, the optics assembly 3 can be simultaneously rotated while being moved in the primary and secondary scan directions 115, 116 in order to obtain a linear array 110 of any desired orientation on the powder bed surface 100.

Figure 28:
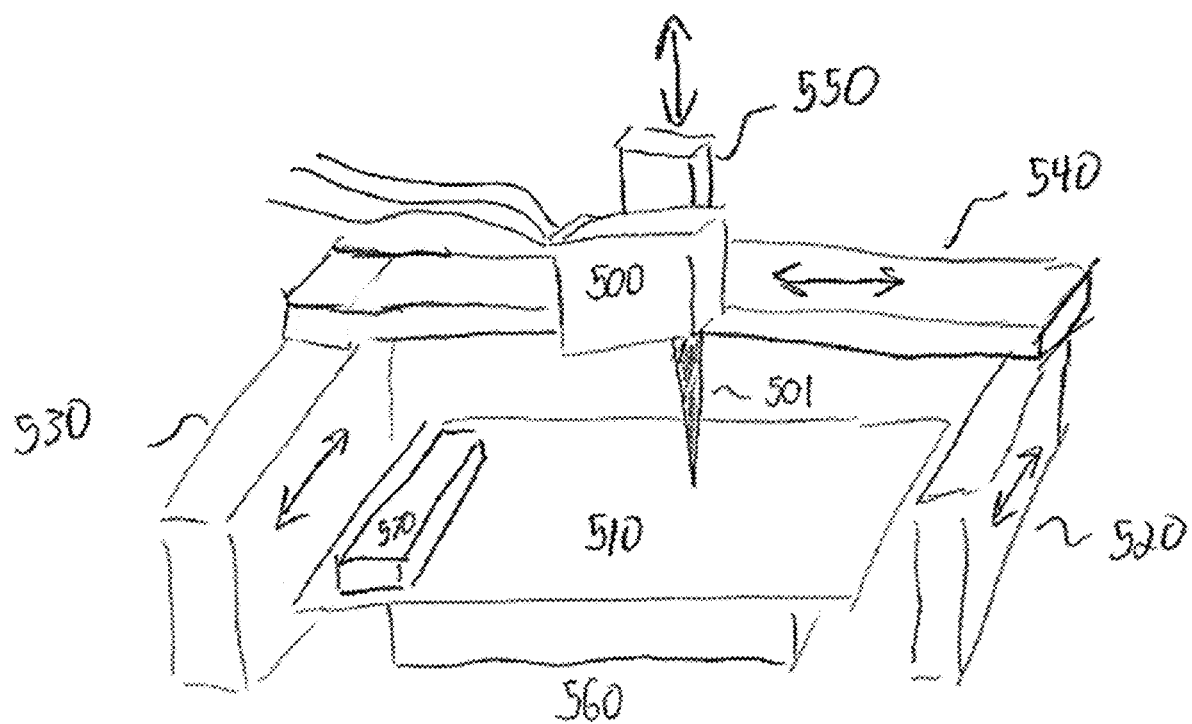
FIG. 28 is a schematic representation of another embodiment of an additive manufacturing system.

FIG. 28 shows one possible layout for a multi-source powder bed laser fusion system. A build surface 510 can be indexed up or down using a vertical slide system 560. A recoater head 570 is arranged to add a layer of material (e.g., a powdered metal) on to the build surface after the vertical slide is indexed down. An optics assembly 500 that receives the optical fibers from the multiple laser sources is mounted on another vertical slide 550 that is mounted on a cross slide 540 that can produce motion in the lateral direction. Each end of the cross slide is mounted gantry style on linear slides 520,530 that enable the cross slide to be moved in the other lateral dimension. In this manner, the output 501 from the optics assembly may be scanned over the entire build surface as desired.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An additive manufacturing system comprising:
a build surface;
two or more laser energy sources;
two or more optical fibers, each optical fiber configured to transmit laser energy from a first end coupled to an associated laser energy source of the two or more laser energy sources and out of a second end, wherein the second ends of the two or more optical fibers are arranged along a line; and
an optics assembly constructed and arranged to shape the laser energy output from each optical fiber to form a laser energy pixel associated with each laser energy source, wherein the laser energy pixels are arranged to form a linear array of laser energy pixels on the build surface, and wherein exposure of a layer of material on the build surface to the linear array of laser energy pixels melts at least a portion of the layer of material,
wherein the optics assembly comprises at least one lens array including one or more micro-lenses and one or more objective lenses positioned after the at least one lens array along an optical path of the optics assembly, and
wherein the one or more micro-lenses and one or more objective lenses are configured to control a shape, size, and spacing of the laser energy pixels.

2. The additive manufacturing system of claim 1, wherein the laser energy output from each optical fiber has a round beam shape, and the at least one lens array is configured to transform the laser energy output from each optical fiber into a rectangular beam shape having a substantially uniform power density.

3. The additive manufacturing system of claim 2, wherein the one or more objective lenses are configured to demagnify the laser energy output from the at least one lens array to form the linear array of laser energy pixels on the build surface.

4. The additive manufacturing system of claim 1, wherein each laser energy source of the two or more energy sources is independently controllable to adjust a power level of an associated laser energy pixel.

5. The additive manufacturing system of claim 4, wherein adjusting the power level of one or more laser energy pixels adjusts a power density along the linear array of laser energy pixels.

6. The additive manufacturing system of claim 1, wherein the optics assembly is configured to move the linear array of laser energy pixels along a direction perpendicular to the linear array of laser energy pixels.

7. The additive manufacturing system of claim 1, further comprising a fiber mount coupled to the optics assembly, wherein the fiber mount is arranged to receive the second ends of the optical fibers and define a spacing between adjacent second ends of the optical fibers.

8. The additive manufacturing system of claim 1, wherein the optics assembly is at least one of translatable and rotatable relative to the build surface.

9. The additive manufacturing system of claim 1, wherein each laser energy source comprises a fiber laser.

10. The additive manufacturing system of claim 1, wherein each laser energy source comprises a diode laser.

11. The additive manufacturing system of claim 1, wherein a maximum power output from each laser source is between about 200 W and about 1000 W.

12. The additive manufacturing system of claim 1, wherein the linear array of laser energy pixels forms a homogenous line of laser energy on the build surface.

13. The additive manufacturing system of claim 1, further comprising a material depositing system configured to deposit the layer of material onto the build surface.

14. The additive manufacturing system of claim 13, wherein the layer of material comprises a metal powder, and the material depositing system is configured to spread the metal powder on the build surface.

15. The additive manufacturing system of claim 1, wherein each of the laser energy pixels comprises a rectangular laser energy pixel, and wherein each rectangular laser energy pixel has a substantially uniform power density.

16. The additive manufacturing system of claim 15, wherein each rectangular laser energy pixel has a width between or equal to about 50 micrometers and about 200 micrometers.

17. The additive manufacturing system of claim 16, wherein each rectangular laser energy pixel has a width of about 100 micrometers.

18. The additive manufacturing system of claim 1, wherein each laser energy pixel has a substantially uniform power density.

19. The additive manufacturing system of claim 1, wherein there is no spacing between adjacent laser energy pixels.

20. An additive manufacturing system comprising:
a build surface;
two or more laser energy sources;
two or more optical fibers, each optical fiber configured to transmit laser energy from a first end coupled to an associated laser energy source of the two or more laser energy sources and out of a second end, wherein the second ends of the two or more optical fibers are arranged in an array; and
an optics assembly constructed and arranged to shape the laser energy output from each optical fiber to form a laser energy pixel associated with each laser energy source, wherein the laser energy pixels are arranged to form an array of laser energy pixels on the build surface, and wherein exposure of a layer of material on the build surface to the array of laser energy pixels melts at least a portion of the layer of material,
wherein the optics assembly comprises at least one lens array including one or more micro-lenses and one or more objective lenses positioned after the at least one lens array along an optical path of the optics assembly, and
wherein the one or more micro-lenses and one or more objective lenses are configured to control a shape, size, and spacing of the laser energy pixels.

21. The additive manufacturing system of claim 20, wherein each of the laser energy pixels comprises a rectangular laser energy pixel, and wherein each rectangular laser energy pixel has a substantially uniform power density.

22. The additive manufacturing system of claim 21, wherein each rectangular laser energy pixel has a width between or equal to Roftl about 50 micrometers and Rton about 200 micrometers.

23. The additive manufacturing system of claim 22, wherein each rectangular laser energy pixel has a width of about 100 micrometers.

24. The additive manufacturing system of claim 20, wherein each laser energy pixel has a substantially uniform power density.

25. The additive manufacturing system of claim 20, wherein the laser energy output from each optical fiber has a round beam shape, and the at least one lens array is configured to transform the laser energy output from each optical fiber into a rectangular beam shape having a substantially uniform power density.

26. The additive manufacturing system of claim 25, wherein the one or more objective lenses are configured to demagnify the laser energy output from the at least one lens array to form the array of laser energy pixels on the build surface.

27. The additive manufacturing system of claim 20, wherein each laser energy source of the two or more energy sources is independently controllable to adjust a power level of an associated laser energy pixel.

28. The additive manufacturing system of claim 27, wherein adjusting the power level of one or more laser energy pixels adjusts a power density along the array of laser energy pixels.

29. The additive manufacturing system of claim 20, wherein the optics assembly is configured to move the array of laser energy pixels along a direction perpendicular to the array of laser energy pixels.

30. The additive manufacturing system of claim 20, further comprising a fiber mount coupled to the optics assembly, wherein the fiber mount is arranged to receive the second ends of the optical fibers and define a spacing between adjacent second ends of the optical fibers.

31. The additive manufacturing system of claim 20, wherein the optics assembly is at least one of translatable and rotatable relative to the build surface.

32. The additive manufacturing system of claim 20, wherein each laser energy source comprises at least one selected from a group of a fiber laser and a diode laser.

33. The additive manufacturing system of claim 20, wherein a maximum power output from each laser source is between about 200 W and about 1000 W.

34. The additive manufacturing system of claim 20, wherein the array of laser energy pixels forms a homogenous distribution of laser energy on the build surface.

35. The additive manufacturing system of claim 20, further comprising a material depositing system configured to deposit the layer of material onto the build surface.

36. The additive manufacturing system of claim 35, wherein the layer of material comprises a metal powder, and the material depositing system is configured to spread the metal powder on the build surface.

37. The additive manufacturing system of claim 20, wherein the array of laser energy pixels comprises a rectangular array of laser energy pixels.

38. The additive manufacturing system of claim 20, wherein there is no spacing between adjacent laser energy pixels.

* * * * *

UNITED STATES PATENT AND TRADEMARK OFFICE
CERTIFICATE OF CORRECTION

PATENT NO. : 10,875,094 B2  Page 1 of 1
APPLICATION NO. : 15/940315
DATED : December 29, 2020
INVENTOR(S) : Martin C. Feldmann et al.

It is certified that error appears in the above-identified patent and that said Letters Patent is hereby corrected as shown below:

On the Title Page

At item (72), the place of residence of Inventor Matthew Sweetland "Burlington, MA (US)" should be replaced with: -- Bedford, MA (US) --

In the Claims

At Column 19, Line 5, Claim 22 after "to" delete "Roftl" and after "and" delete "Rton"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*